Patented Aug. 29, 1933

1,924,968

UNITED STATES PATENT OFFICE 1,924,968

PROCESS FOR THE MANUFACTURE OF VACCINES

Werner Weichlein, Prenzlau, Germany

No Drawing. Application December 20, 1927, Serial No. 241,455, and in Germany December 24, 1926

2 Claims. (Cl. 167—78)

It is well-known that men and animals are protected from or cured of infectious diseases by means of inoculation. Living, enfeebled or dead morbific agents (germs) or infectious matter or its products are used as inoculation vaccines which are obtained by various different ways and methods, while the morbific agents are cultivated by artificial means or their virulence is modified by being passed through suitable animals.

It is also already known how to kill or render uninjurious these morbific agents or their products by aniline dyes or aniline, or how to avoid infectious diseases by introducing pigments in the bodies of animals. In this way it has not, however, been possible to produce vaccines which can be given in exact doses and are immediately applicable without causing complication.

The object of the invention is a process for the manufacture of inoculation vaccines, whereby the infectious matter (virus) or the morbific agents or their products are mixed with weak solutions of aniline dyes and the mixture kept at a temperature of blood heat (37° C.) for one to two days. By the term "infectious matter" I mean the germs in pure culture or in mixture, and they may be contained in liquids, etc. Thus the pathogenic element is broken up, although the immunifying effect is retained. Various clearly defined solutions of aniline dyes, which are used in certain quantities, are suitable for the separate morbific agents. Thus a 5% methyl blue solution is especially suited to the treatment of red murrain bacillus, for the bacteria paratyphy enteritidis (Gärtner), which gives rise to poisoning in human beings, a 20% brilliant green solution is most suitable, and a 5% fuchsine solution for the birds' cholera bacillus, and so forth.

The morbific agents or infectious matter can, in accordance with this invention, be so influenced that either they no longer grow after being transferred to artificial soil and test animals can no longer contract disease through them, or the effect may be that, on being transferred to artificial soil, a growth and an increase take place as in the case of an ordinary culture, although test animals can no longer contract diseases. The virulence of the morbific agents or of the infectious matter can thus be eliminated absolutely at will. A subsequent alteration of the inoculation vaccine does not appear. The latter therefore remains constant, which, in view of the intended effect, is exceedingly important. According to the invention, the manufacture of effectual inoculation vaccines is thus successfully undertaken if bacteria cultures, and especially morbific agents of animals or plant-type, which either themselves or through their poisons contain liquids—many morbific agents (germs) have not, however, been isolated as yet, such as those of the foot and mouth disease and smallpox—are kept, after the addition of pigments, at a blood-heat temperature for 24 to 48 hours.

According to this invention it is possible to deprive the infectious matter (virus) which develops those diseases, the germs of which are not known, of its infectious qualities and to use said infectious matter after being treated with aniline dyes as inoculation for man and animals to protect them against infection.

Such substances are for instance the extracts of organs of animals suffering of such diseases, or liquids or body fluids containing the infectious matter just referred to.

Up to the present, the medical faculty has not been successful in producing a highly immunifying serum by transferring through inoculation enfeebled or dead morbific agents and infectious matter to serum animals. For this purpose, living morbific agents had to be used to be effective. With the new inoculation vaccine alone, however, it is possible to produce a serum, even in the case of red murrain disease, containing over 200 units of immunity, which has hitherto been impossible. This fact is very important for the reason that the transfer of living morbific agents to serum animals by inoculation, in fever cases which are frequently of long duration, causes inflammation of the joints and the setting in of poisoning. By the use of the new inoculation vaccine, on the other hand, these complications, which very often cause the death of the serum animal, do not occur.

The process is carried out in the following manner:

Watery solutions of aniline dyes, such as fuchsine or brilliant green, are mixed with watery deposits of bacterial or infectious matter (e. g. in physiological salt solution). These mixtures have then to be shaken thoroughly and to be kept at a temperature of 37° C. for 24 hours or longer, as only at a temperature of blood-heat do the bacteria or infectious germs and the aniline dyes react or become incorporated.

In the place of watery deposits of bacteria can be used bouillon cultures or fluids which contain bacteria or infectious matter.

A detailed description of the production of one vaccine, i. e., a pigmentary vaccine against the infectious calving (abortus bang) is herein given:—Sterile nutrient broth is inoculated in retorts each containing 2 litres by pouring liquid Abortus Bang cultivation over it and depositing it in an incubator of 37° C. to promote the growth of the bacteria. In it the Abortus Bang bacteria will grow luxuriantly within 10–12 days. This cultivation is then microscopically examined in order to ascertain whether the cultivation has remained pure, i. e. whether only Abortus Bang bacilla have been growing in same. This being the case, 300 cc. of a 2% aqueous methylene-blue solution is admixed to every retort which, as stated above, has a capacity of 2 litres. After this the retorts are stirred thoroughly and placed into an incubator of 37° C. for a time of 48 hours. By the addition of the dye and the simultaneous heating up to body-temperature the Abortus Bang bacteria are thus killed. After 48 hours have passed, the prepared vaccine is carefully examined to ensure that all of the bacteria have been entirely killed by the preceding procedure. This is effected by a small quantity of the vaccine being deposited upon one solid and one liquid nutrient medium each, and placing the latter once more into the incubator, with a view to seeing whether a further growth of the bacteria will result. Should this not be the case in the little test-tube, the vaccine is poured into the ampoules most appropriate for practical treatment and then dispatched ready for sale. This is of course only an example, but the process is essentially the same in producing vaccines against other diseases, although the bacteria and particular aniline dye may be changed.

The effect of the new process is clear from the following examples of the production of highly immunifying serum.

*Example 1*

A mule, which, after being treated with the hitherto customary immunity method with living red murrain bacillus, when it only gave a serum containing 100 units of immunity, was inoculated with a 150 ccm. vaccine according to the new process, and four days later again with 150 ccm. of the same vaccine. The value of the serum, after seven more days, had risen to 200 units of immunity and is now so high that the animal which was at first put aside as useless could continue to be used for serum production.

*Example 2*

A horse was to be discarded as useless, as it had not produced serum of high immunity since April 1926, the value of the serum having sunk below 100 units. It was first inoculated with 150 ccm. vaccine produced by the new process and the treatment was repeated with 200 cc. of the same vaccine after four days, with another 200 cc. after seven more days and with 300 cc. after another three days. The value of its serum, after twenty-one days from the first inoculation, had risen to 150 units of immunity.

It is thus shown that it is possible to immunify animals to a high degree against the red murrain bacillus by using red murrain bacilli incorporated with aniline dyes. For these experiments an inoculation vaccine completely killed by methyl blue was used, and it was found that small test animals, such as white mice, remained healthy after the inoculation, and the bacilli thus treated could not grow in artificial soil.

*Example 3*

The disease affecting poultry known as "gapes" is an example of those diseases, the germs of which have not been isolated up to the present. This germ is contained in those organs of the fowl affected by the disease. Organic extracts are now mixed with a 5% solution of methyl blue. With this solution eight fowls were sprayed under the skin each with three cc. After fifteen days, these fowls were, together with two untreated test fowl, infected under the skin with 1 cc. organic extract. The untreated test fowl died within five days, while the previously inoculated fowl continued to live.

*Example 4*

It has previously been impossible to immunify birds against birds' cholera with any vaccine inoculation in such a way that, after a subsequent artificial infection (by means of an injection under the skin or between the muscles), they continued to live. The test birds died almost without exception. With birds' cholera bacilli killed by fuchsine in the manner above described, one has succeeded, however, in immunifying birds safely. In this connection, six fowl were inoculated with 4 cc. of the new birds' cholera vaccine and these fowl, together with a fowl not previously treated, were infected under the skin with 0.3 cc. of a 24-hours' bouillon culture of birds' cholera. The fowl not previously treated died of birds' cholera after 48 hours, as was ascertained by pathological, anatomical and microscopical examination, while the six fowl previously inoculated remained alive.

*Example 5*

The blood serum of a plague peculiar to swine was mixed with 1%, 3% and 5% of a 20% brilliant green solution and, after being shaken up, was placed in a hatching-cupboard at a temperature of 37 Cent. and left there for 48 hours. Then three pigs were inoculated, each with 10 cc. of these fluids. The three pigs remained healthy, which is evidence of the fact that the swine plague virus was killed by the addition of pigment. After 21 days, the three pigs and another previously untreated test pig were infected between the muscles with 5 cc. of swine plague virus. The three inoculated pigs ate badly on the 7th and 8th days, after the infection, but otherwise remained healthy, while the test pigs, after a four days' illness, died eleven days after infection from the swine plague.

From these examples it is clear that such infectious diseases as are caused by an unknown germ with a so-called "filterable" virus against which no effective immunifying agent previously found can likewise be compared, if not stamped out.

Having now described my invention, what I claim and desire to secure by Letters Patent is—

1. Process for the manufacture of inoculation vaccines consisting in mixing the infectious matter with watery solutions of aniline dyes and then maintaining the mixture at a blood temperature of 37° C. for a period of at least 24 hours up to two days, whereby all bacteria in the infectious matter is killed.

2. In a process according to claim 1, inoculating animals with the mixture thus obtained for the purpose of obtaining a serum.

WERNER WEICHLEIN.